US005655644A

United States Patent [19]

Graef

[11] Patent Number: 5,655,644

[45] Date of Patent: Aug. 12, 1997

[54] SEAMLESS PAPER MEDIA GATE

[75] Inventor: H. Thomas Graef, Bolivar, Ohio

[73] Assignee: InterBold, North Canton, Ohio

[21] Appl. No.: 423,621

[22] Filed: Apr. 17, 1995

Related U.S. Application Data

[63] Continuation-in-part of Ser. No. 4,829, Jan. 15, 1993, Pat. No. 5,422,467.

[51] Int. Cl.[6] ..................... B65G 47/66

[52] U.S. Cl. ..................... 198/437; 14/71.3; 414/537; 271/188; 271/186; 271/69

[58] Field of Search ..................... 198/600, 437, 198/539, 599, 543, 560; 193/17, 38, 44, 46, 15, 14, 18; 271/186, 188, 69; 414/537, 538, 745.9, 746.4; 14/71.3, 71.7, 71.1

[56] References Cited

U.S. PATENT DOCUMENTS

| | | | |
|---|---|---|---|
| 3,669,442 | 6/1972 | Thomas | 271/188 X |
| 3,674,256 | 7/1972 | Brookhyser | 271/69 X |
| 4,328,602 | 5/1982 | Bennett | 14/71.3 |
| 4,526,361 | 7/1985 | DuBois | 271/186 |
| 4,823,930 | 4/1989 | Löw | 198/437 |

FOREIGN PATENT DOCUMENTS

| | | | |
|---|---|---|---|
| 252545 | 12/1985 | Japan | 271/69 |
| 407878 | 9/1966 | Switzerland | 14/71.3 |

*Primary Examiner*—Frank E. Werner
*Attorney, Agent, or Firm*—Ralph E. Jocke

[57] ABSTRACT

A seamless paper media gate (10) for supporting moving sheets thereon while enabling the sheets to be directed in a range of angular directions, includes a plate member (12), a deflector member (48), and a spring (44). The plate member includes a first sheet supporting surface (14), and an end portion (16). The end portion includes a transition surface (18), which in cross section terminates at a transition edge (20). The deflector member is rotatably mounted on the plate member and includes a second sheet supporting surface (22). The deflector member includes in cross section a first finger portion (26) upon which the second surface is tapered to a point (28) which forms a lineal edge (27) that engages the transition surface. The deflector member also has a first rib (38) that engages a of a first slot (34). The rib includes a cam surface (43) that suitably engages a cam support surface of the slot to provide a fixed pivot point as the deflector member rotates. The spring is a three-way spring that acts on said deflector member and urges the lineal edge to maintain engagement with the transition surface, and urges the cam surface to be in engagement with the cam support surface of the slot. In all angular positions in the range the lineal edge is in gapless connection with the transition surface so that documents may be moved thereon without snagging.

31 Claims, 9 Drawing Sheets

SEAMLESS PAPER MEDIA GATE

CROSS-REFERENCE TO RELATED APPLICATION

This Application is a continuation-in-part of U.S. Ser. No. 08/004,829 filed Jan. 15, 1993, now U.S. Pat. No. 5,422,467 the disclosure of which is incorporated herein by reference.

TECHNICAL FIELD

This invention relates to a seamless paper media gate. More particularly this invention relates to a device that acts as a conduit for transporting paper media between locations in two directions and which enables the detection of the media on the apparatus as the apparatus directs the sheets therefrom in a range of angular positions. This invention is particularly suited for use in automatic teller machines.

BACKGROUND ART

Automated teller machines (ATMs) are well known in the prior art. A variety of banking transactions can be performed using ATMs. The most common transactions are dispensing cash and receiving deposits.

Currently many ATMs only accept deposits in envelopes. The envelopes may contain checks, currency or other documents of value. The customer is required to input into the machine the value of the items deposited in the envelope using a keypad. A marking mechanism in the ATM typically marks the envelope with identifying data so it can be correlated with the customer's transaction. A record of the deposit is also made on paper and/or in electronic memory. Later, the bank or other entity operating the ATM must compare the contents of the envelope to the data input by the customer to be sure the customer entered the correct mount. The various items in the envelopes are then sorted and sent for further counting and processing.

To minimize the time required for verifying deposits, an ATM has been developed that includes mechanisms which can identify the denomination of paper money, scan and read checks, and electronically copy both sides of a check or other negotiable instrument. Such devices may also sort the deposited items, directing them to various compartments within the ATM. This reduces the time necessary to verify deposits. It also reduces the need for further processing and sorting outside the ATM. Such an apparatus for accomplishing these functions is shown in my co-pending U.S. application Ser. No. 08/004,829, now U.S. Pat. No. 5,422,467 the disclosure of which is incorporated herein by reference.

The movement of documents within the ATM which is necessary to reliably accomplish identification, reproduction and sorting is complex. Documents must be precisely aligned in the document path to be read and reproduced. Documents must also be directed between various conveying mechanisms and compartments.

The movement of documents between various types of conveying mechanisms and holding compartments present challenges. This is because the interface between such items often includes a seam or gap in which documents may become caught or jammed. The more places or directions a particular document must be directed, the more difficult it becomes to reliably transport the document.

Thus, there exists a need for a device for supporting paper documents during transport within an ATM which can deliver documents in various selected angular directions while not having a seam upon which such documents can become caught or snagged.

DISCLOSURE OF INVENTION

It is an object of the present invention to provide a seamless paper media gate which provides a gapless support over which paper sheets may be passed in two directions.

It is a further object of the present invention to provide a seamless paper media gate for supporting moving sheets thereon while directing said sheets in a range of angular directions.

It is a further object of the present invention to provide a seamless paper media gate for use in an automated teller machine, which gate can be contorted in a range of angular positions.

It is a further object of the present invention to provide a seamless paper media gate for use in a automated teller machine which can be used in conjunction with sensors to determine the presence and alignment of sheets thereon.

It is a further object of the present invention to provide a seamless paper media gate for use in an automated teller machine which provides for precise alignment of paper sheets passing over the gate.

It is a further object of the present invention to provide a seamless paper media gate that is durable, reliable and simple in construction.

Further objects of the present invention will be made apparent in the following Best Mode for Carrying Out Invention and the appended claims.

The foregoing objects are accomplished in the preferred embodiment of the invention by a seamless paper media gate that includes a plate member, a deflector member and a spring.

The plate member includes a generally planar first sheet supporting surface. The sheet supporting surface is wider than a width of the sheets that may be transported on the surface in a direction in which the sheets travel. The sheet supporting surface terminates at an end portion. The end portion includes in cross section a transition surface extending at an acute angle relative to the first sheet supporting surface and which is a smooth continuation thereof. The end portion terminates in a transition edge.

The deflector member is movably mounted on the plate member. The deflector member includes a second sheet supporting surface. The deflector also has first, second and third finger portions. In cross section the first finger portion is smoothly tapered to a point where it engages the transition surface. The lineal edge formed at the cross sectional point of contact forms a gapless, smooth connection with the transition surface of the plate member through a range of angular positions of the deflector member.

A second finger portion of the deflector member extends generally parallel of the first finger portion. The second finger portion limits the angular movement of the deflector by engagement with the end portion at a first end of its angular range.

The end portion of the plate member includes a fast slot located medially on the end portion and a notch located distally on the end portion. A first rib on the deflector member extends in the first slot. In the first embodiment of the invention, the first rib has a cam surface which slidably engages a transversely extending cam support surface of the slot. The first rib further engages a deflector bearing surface on a transverse side of the first slot. A second rib on the deflector member extends in the notch. The second rib has a side face which engages a side guide. The side guide is effective for aligning sheets moving on the device. In a second embodiment of the invention, the side guide alone supports the deflector member in the transverse direction, in which case the first rib engages the cam support surface but is disposed away from the sides of the slot.

A three-way spring extends between the plate member and the deflector member. The three-way spring biases the deflector member urging the lineal edge towards the transition surface. The spring further biases the first rib to engage the cam support surface of the slot. The spring also biases the rib to engage the bearing surface of the slot in the first embodiment, and the side face to engage the side guide in the first and second embodiments. The spring further biases the deflector member angularly toward the first end of the range.

The deflector member provides a support for sheets moving thereon. The deflector member is positionable anywhere in its angular range while providing seamless and gapless engagement with the transition surface. As a result, sheets may be reliably moved in either direction over the device. The apparatus further provides consistent and repeatable movement so that sheets moving thereon may be reliably accepted and removed from other mechanisms within the machine.

BEST MODES FOR CARRYING OUT INVENTION

Figure 1:
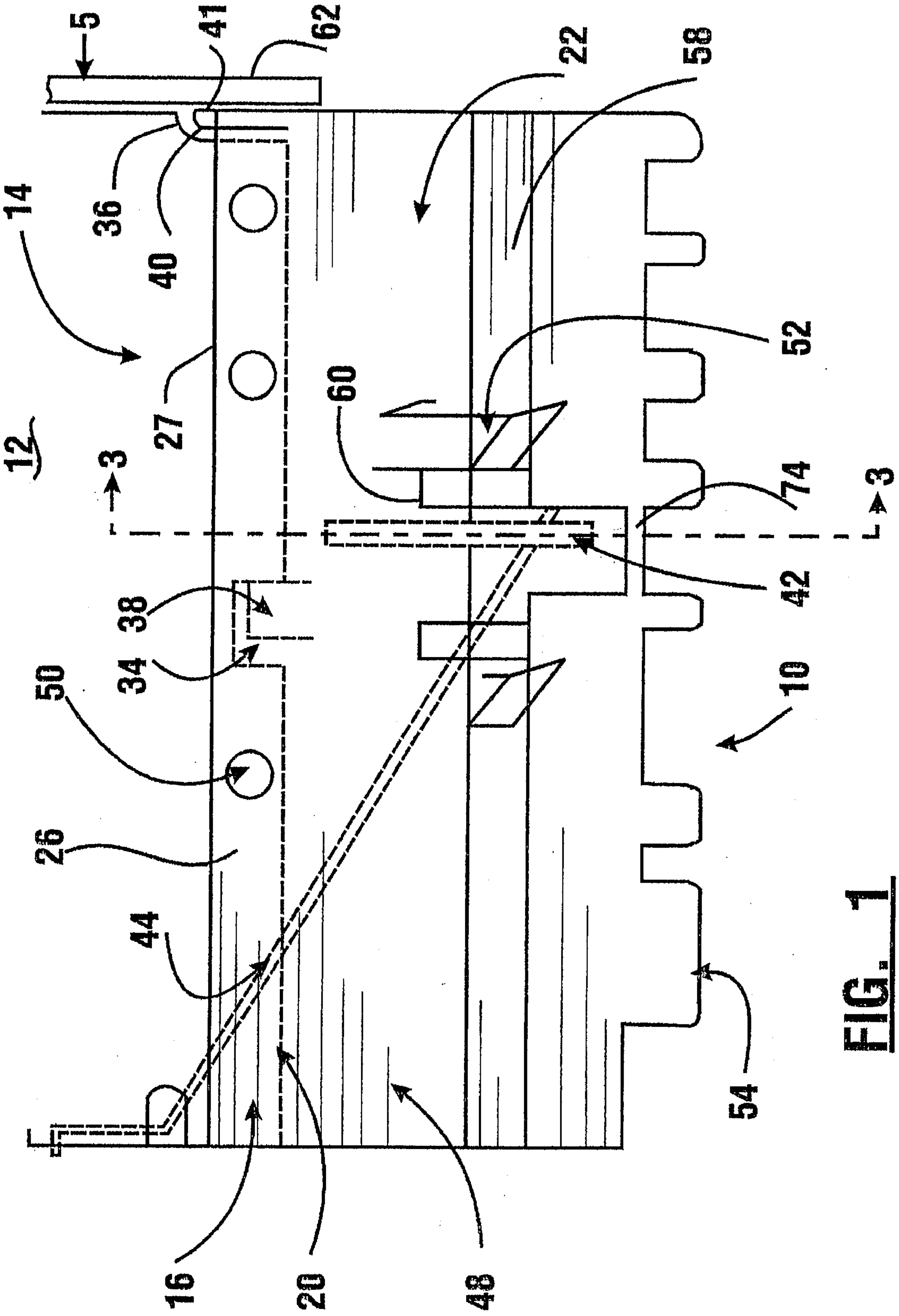
FIG. 1 is a top plan view of a first embodiment of the seamless paper media gate of the present invention.

Referring now to the drawings and particularly to FIG. 1, there is shown therein a first embodiment of the seamless paper media gate of the present invention, generally indicated 10. The seamless paper media gate includes a plate member 12, a deflector member 48, and a spring 44.

The plate member 12 includes a generally planar first sheet supporting surface 14. Sheet supporting surface 14 while being generally planar may advantageously include longitudinally extending ribs. Such ribs are useful in breaking surface tension between sheets that are moved in the sheet direction, particularly sheets that may be wet, damp or humid, and the surface. Further, in alternative embodiments, the generally planar surfaces of the present invention may be comprised of a plurality of separate members each of which have surfaces for supporting the sheet.

Figure 2:
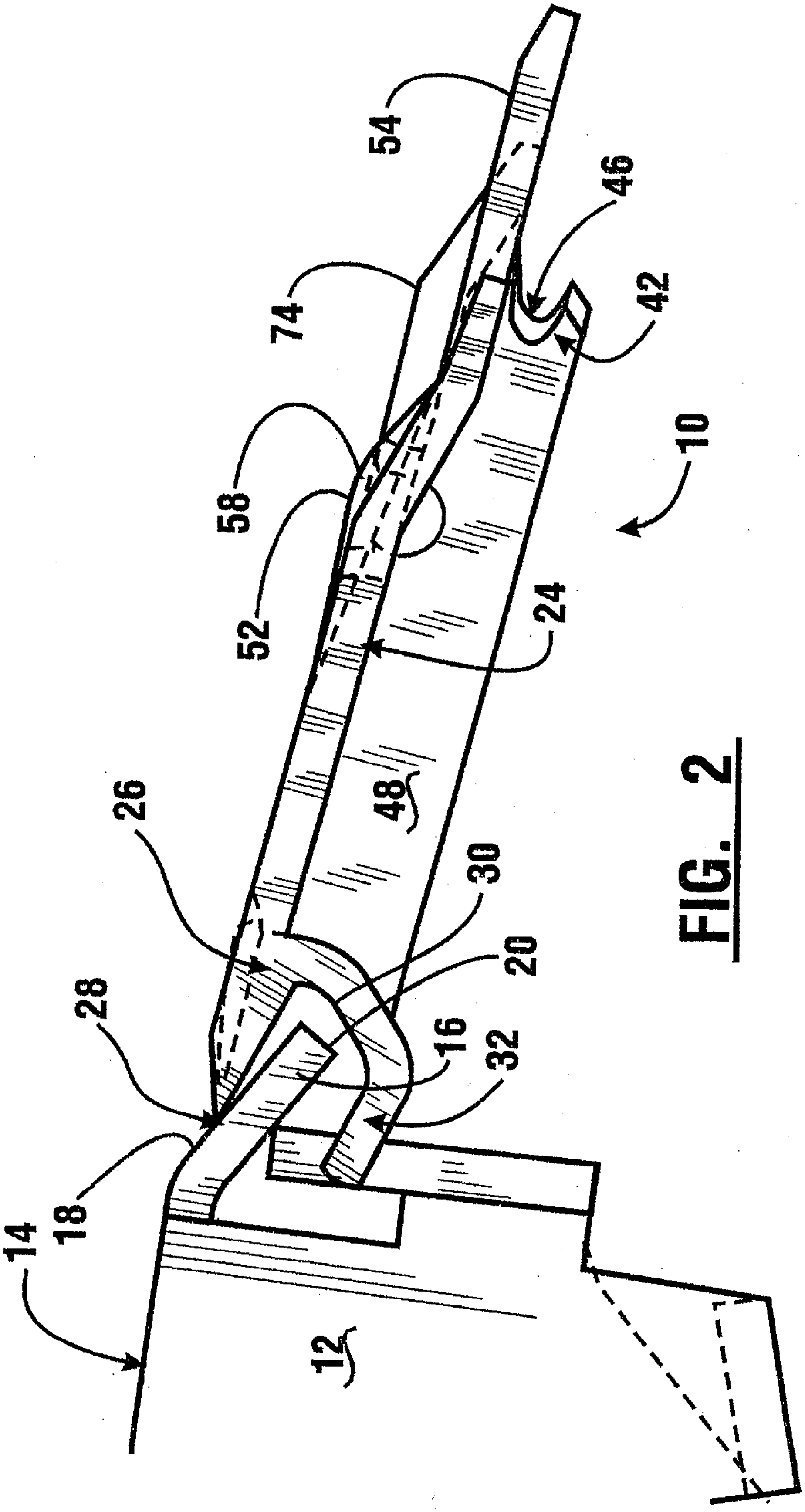
FIG. 2 is a side view of the seamless paper media gate.

As shown in FIG. 2, the first sheet supporting surface 14 in cross section includes an end portion 16. The end portion 16 includes in a transition surface 18 which is a smooth continuation of and extends at an acute angle relative to the first sheet supporting surface 14. The transition surface 18 terminates at a blunt transition edge 20.

The deflector member 48 is movably mounted on the plate member 12. Deflector member 48 has a generally planar second sheet supporting surface 22. Again like surface 14, surface 22 while generally planar may have longitudinally extending ribs or other surface tension breaking features thereon. Sheet supporting surface 22 has thereon in cross section a second transition surface 58 that extends at an acute angle relative to surface 22. The deflector member also has a pair of spaced sheet engaging edges 52. Recesses 60 are positioned adjacent to edges 52. As later discussed recesses 60 are adapted for accepting the tines of a sheet guide member. The deflector member also includes a plurality of projections 54. Projections 54 are used to fill the gaps between rollers within an automatic teller machine which are used to move the sheets.

The deflector member 48 further includes in cross-section a first finger portion 26. The first finger portion 26 is tapered to a point 28 where it engages the transition surface 18. The finger portion provides a smooth transition from the transition surface of the plate member to the second surface 22. First finger portion 26 engages the transition surface along a lineal edge 27. The finger portion 26 provides a smooth continuation of the transition surface 18 throughout a range of angular positions of the deflector member.

As shown in FIG. 2, the deflector member further includes in cross-section a bridge surface 30 which extends transversely of the first finger portion 26. The bridge surface 30 is always slightly disposed of the transition edge 20 throughout the range of movement of the deflector member. The deflector member further includes in cross-section a second finger portion 32. Finger portion 32 extends traversely of the bridge surface 30 and generally parallel to the first finger portion 26. The second finger portion 32 limits the range in which the deflector member may move. At a first extreme of rotational movement of the deflector member shown in FIG. 3, end portion 16 engages the second finger portion 32.

Figure 7:
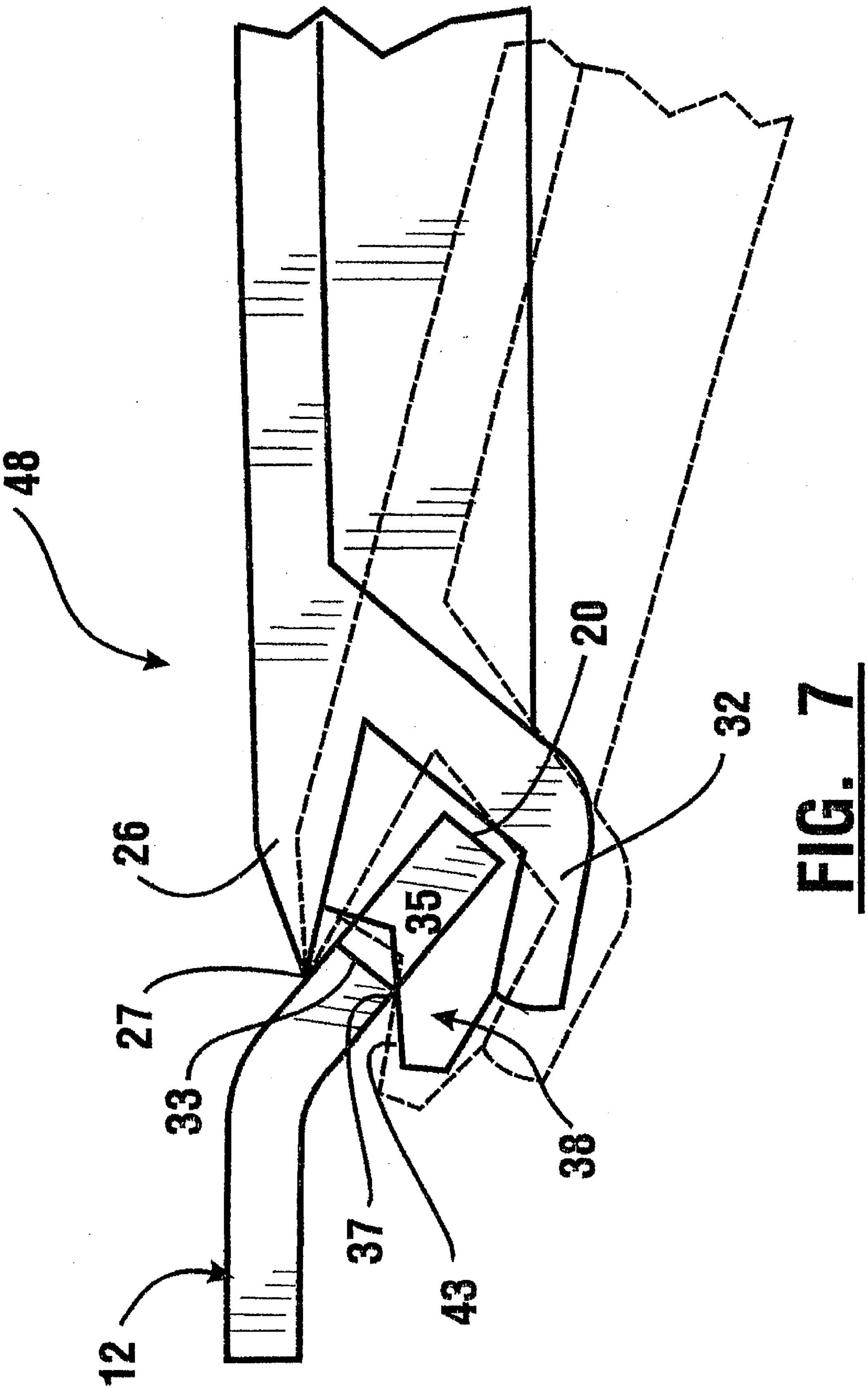
FIG. 7 is an enlarged cross sectional view of the first rib of the deflector member in engagement with the slot of the plate member.

As shown in FIG. 1, the end portion 16 of the plate member includes a first slot 34 located generally centered on the end portion. The deflector member includes a first rib 38 that projects into the first slot 34. As shown in FIG. 7 slot 34 is bounded inwardly by a back surface 33. Back surface 33 is disposed inwardly from transition edge 20. Back surface 33 in cross section has a edge 37 at its lower end which serves as a cam support surface.

First rib 38 extends between the first and second finger portions. First fib 38 has a projection 39 which extends below edge 37 as shown. The projection 39 is bounded by a cam surface 43. As later discussed in detail, cam surface 43 slidably engages the cam support surface at edge 37 throughout the range of rotational movement of the deflector member.

The first rib 38 further includes a rib side surface that extends generally perpendicular to the back surface 33 and cam surface 37. In the first embodiment of the invention shown in FIGS. 1 and 5, the rib side surface of first rib 38 is in abutting rotatably slidable engagement with a deflector bearing surface 35 on the side of slot 34. In this manner, the deflector member is movably supported on end portion and prevented from moving transversely.

The end portion further includes a notch 36 at a transverse end. The deflector member includes a second rib 40 that extends in the notch. The second rib includes a side face 41.

Side face 41 slidably, abuttingly engages a side guide 62. Side guide 62 is biased in the direction of arrow S by a spring or suitable biasing means.

The deflector member 48 further includes in cross-section a third finger portion 42 which projects from lower face 24. A detent 46 extends in the third finger portion 42 and is bounded by lower first face 24. The detent 46 accepts a leg of the spring 44 therein. Detent 46 is angled similar to the leg of the spring which enables the leg of the spring to slide while engaged in the detent as the deflector member moves.

In the preferred embodiment of the invention the spring 44 is a three-way spring that extends between the plate member 12 and the detent 46 whereby the spring serves as a connecting member operatively connecting plate member 12 and deflector member 48. The spring is removably mounted to the plate member and its leg extends outward and upward as shown to engage the detent. Spring 44 biases the deflector member 48, urging the lineal edge 27 towards the transition surface 18. The three-way spring 44 also biases the towards the cam support surface at edge 37 of the slot, and the rib side surface towards the bearing surface 35. The three-way spring also biases the deflector member rotatably upward as shown in FIG. 2 toward a first end of the range, at which first end the second finger portion engages the end portion 16 preventing further rotation. This biasing force enables the deflector member to be angularly positioned relative to the plate member by the use of other mechanisms that engage and position the deflector member. Upon release, the deflector member returns to its angular position shown in FIG. 3 wherein the second finger portion engages end portion 16.

The end portion 16 of the plate member, first finger portion 26, and second finger portion 32 of the deflector member each contain a plurality of aligned apertures 50 as shown in FIG. 1. The apertures 50 are sized as to allow the passage of light beams of photosensors (not shown) through the apertures. The apertures enable passage of such sensing beams throughout the range of movement of the deflector member. The apertures 50 are used in conjunction with photosensors inside the automated teller machine for the purpose of the detection of documents moving in supported relation on the device. The plural apertures enable such sensors to be used to sense for the width and aligned condition of documents passing over the seamless media paper gate.

As shown in FIG. 1 the sheet guide 62 extends adjacent and in abutting contact with the first surface 14 of the plate member and the second surface 22 of the deflector member. The sheet guide extends perpendicular to such surfaces and provides a surface to assure alignment of the sheets. The sheet guide is biased in the direction of arrow S to assure that it remains adjacent to the sheet supporting surfaces. However the deflector member is freely moveable through its range. The side face 41 of second rib 40 is biased against the sheet guide by the three-way spring 44 and rotates against the sheet guide in gapless relation therewith. The sheets supported on the device are optimally directed toward the sheet guide during transport to maintain them in alignment for detection, reading and/or scanning by other mechanisms in the machine.

Figure 3:
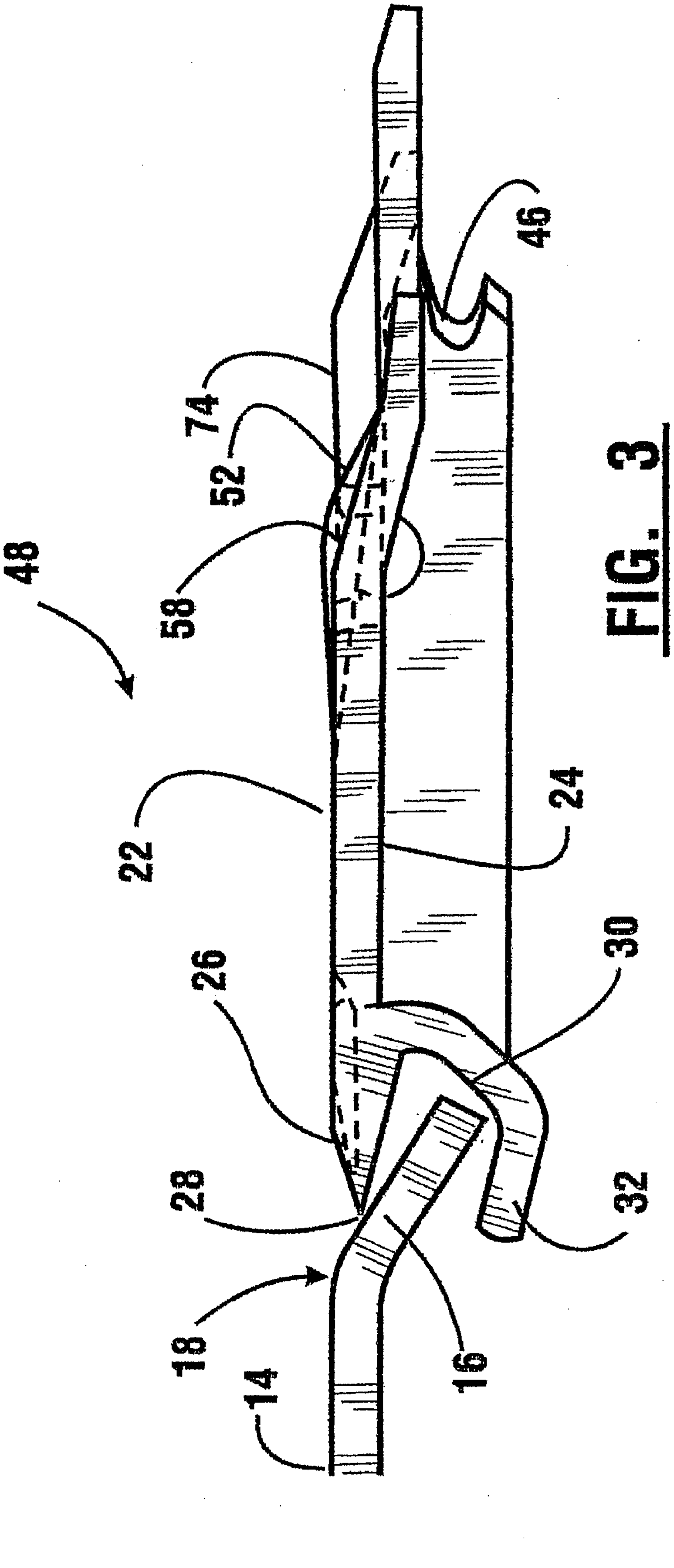
FIG. 3 is a cross-sectional view taken along line 3—3 in FIG. 1 showing the deflector member in a first angular position.
Figure 4:
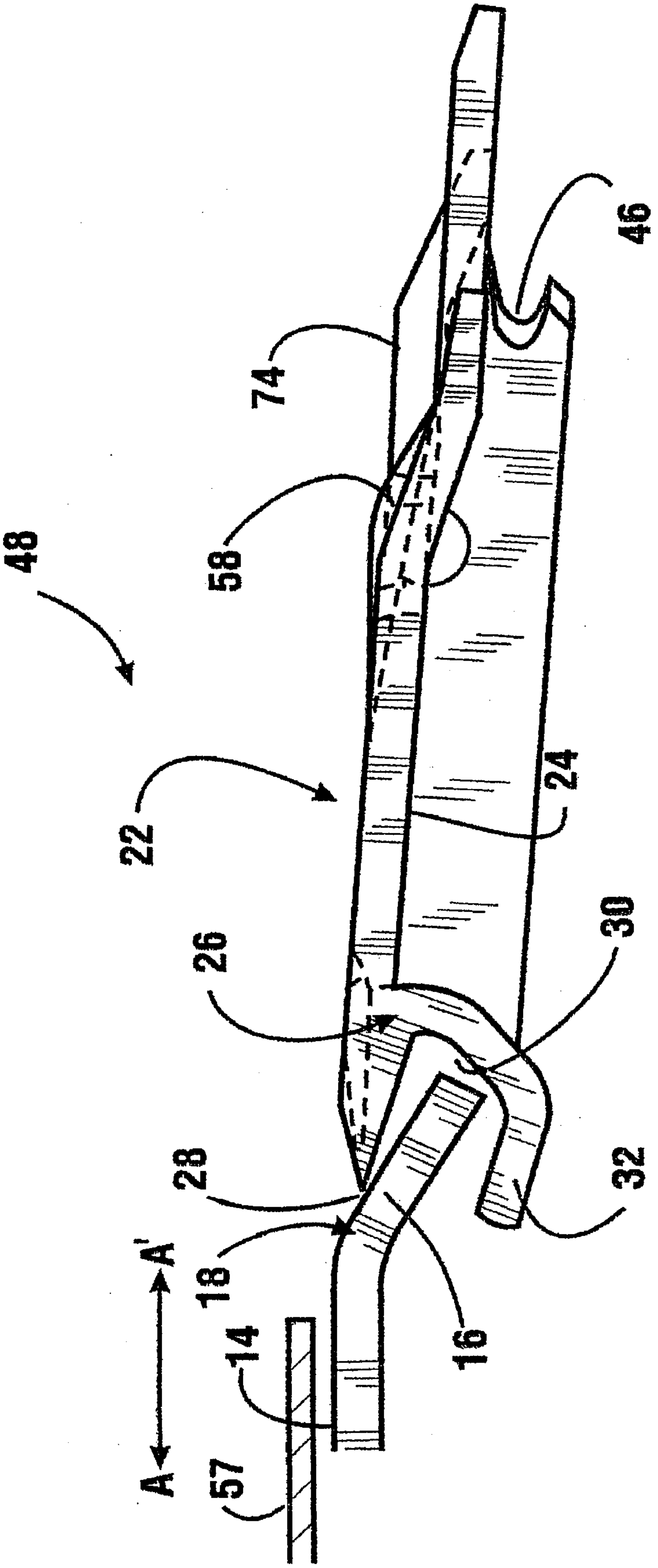
FIG. 4 is a cross-sectional view along line 3—3 in FIG. 1 showing the deflector member in a second angular position.

The deflector member is movable to a first end of its range of angular movement as shown in FIGS. 3 and 7. Alternatively, the deflector is enabled to move to the opposed end of its range as shown in FIG. 4 (and shown in phantom in FIG. 7). As the deflector member rotates the cam surface 43 moves in supported relation with the cam support surface at edge 37. Cam surface 43 is configured so that the lineal edge 27 of the deflector member remains engaged with the plate member at the same location throughout the entire range of movement of the deflector member. Because the deflector member rotates about a fixed pivot point, the deflector member is enabled to be accurately and repeatedly positioned which facilitates receipt and delivery of sheets from other mechanisms in the machine.

During operation a paper sheet 57, such as a check or currency bill is enabled to travel along a sheet path on sheet engaging surface 14 of the plate member 12. The document is preferably propelled in supported relation with surface 14 using a belt moving in the direction of arrows A and A'. Of course in other embodiments rollers or other driving means may be used. Also as previously discussed, the sheet engaging surfaces while generally planar, may include longitudinally extending ribs or other contours or protuberances to avoid resistance or sticking of sheets due to surface tension.

Upon reaching the transition surface 18, the document moving in the sheet path freely moves over the lineal edge 27 of the first finger portion 26, and onto (or off of) the second surface 22 of the deflector member. As there is no gap between the lineal edge and the transition surface at any angular position of the deflector member, documents are free to move along the sheet path from the plate member to the deflector member in either direction without snagging.

Likewise in the fully downward angular condition of the deflector member 48 shown in FIG. 4, there is no gap between the transition surface 18 and the lineal edge. The biasing force of spring 44 maintains the lineal edge against the transition surface in all angular positions in the range. The three-way spring also keeps cam surface 43 of the first rib 38 biased against cam support at edge 37 and the rib side surface against the bearing surface 35 of slot 34. This provides a fixed pivot point for the deflector that enables the lineal edge to be maintained in gapless relation with the transition surface.

The deflector member is positioned at selected angular positions by mechanisms in the ATM engaging the deflector member. The deflector member is used to direct or receive documents to and from various compartments and mechanisms and to transport them reliably onto or off of the plate member. This enables the documents to be aligned and sorted as required.

Figure 8:
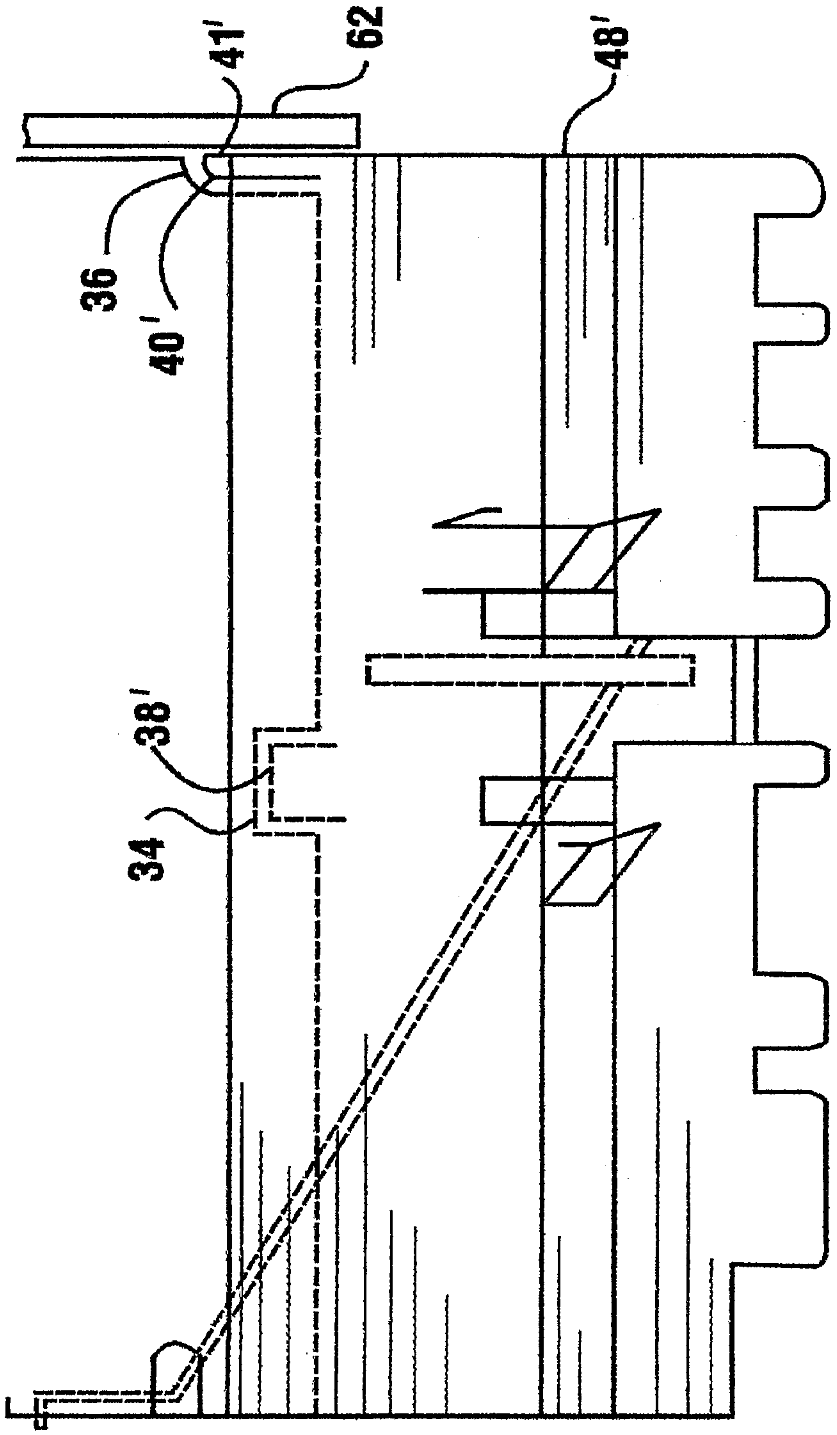
FIG. 8 is a top plan view of a first alternative embodiment of the seamless paper media gate of the present invention.

A first alternative embodiment of the invention shown in FIG. 8 has deflector member 48' which has a rib 38'. Rib 38' is similar to rib 38 in that it has a cam surface like cam surface 43, which moves in abutting contact with the edge 37 of the slot 34. Deflector member 48' differs from deflector 48 in that rib 38' is configured so that its side surfaces are disposed from the side walls of the slot. Deflector member 48' like the first embodiment, has a second rib 40' with a side face 41'. The second rib extends in the notch 36 of the transition surface. The side face 41' engages the side guide 62 which prevents transverse movement of the deflector member 48'. The engagement of the side face 41' and the side guide 62 enables the deflector member to freely rotate while maintaining its transverse position.

Figure 9:
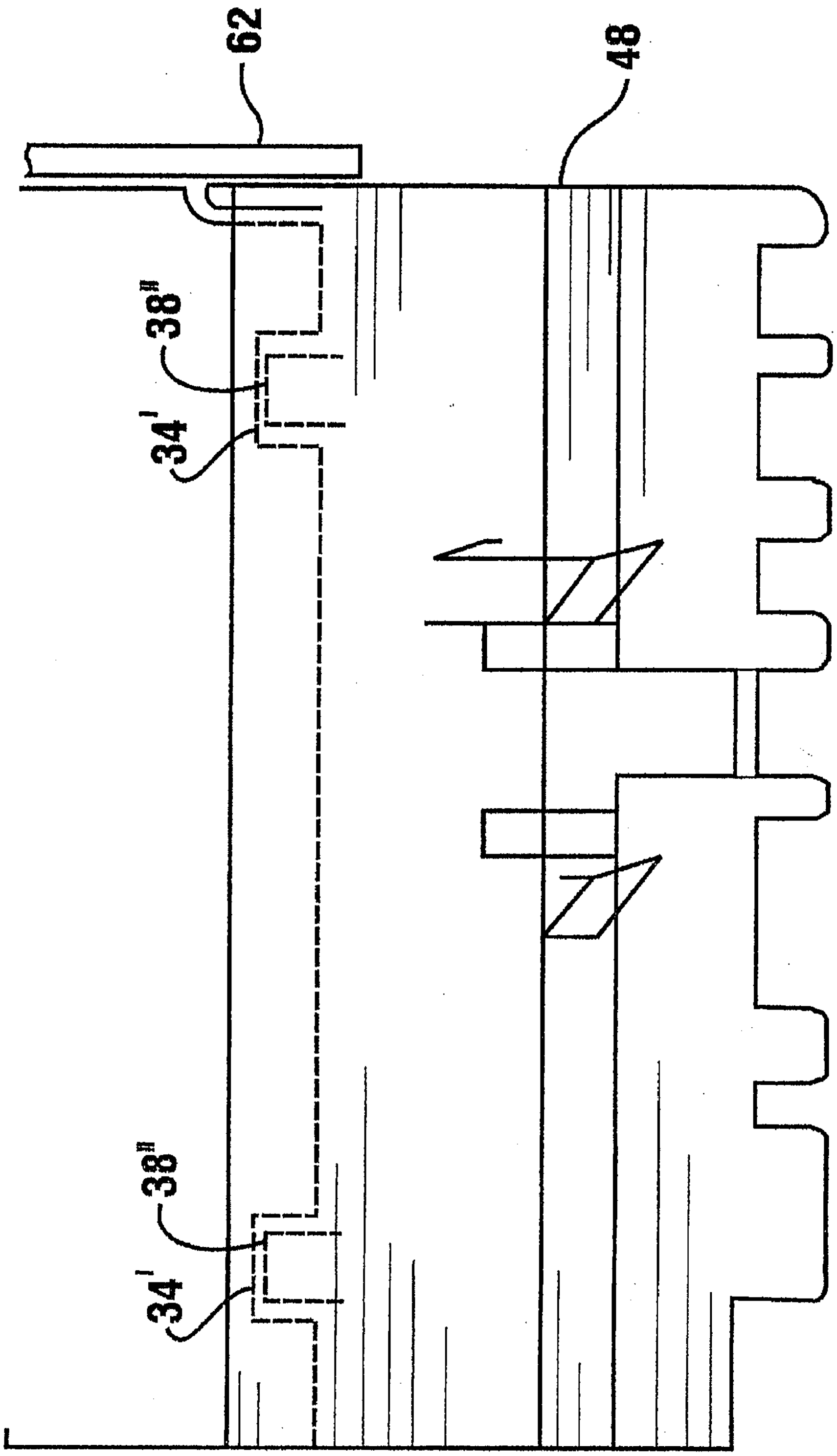
FIG. 9 is a top plan view of a second alternative embodiment of the seamless paper media gate of the present invention.

A second alternative embodiment of the invention is shown in FIG. 9. This embodiment is similar to the embodiments previously described except that its deflector member 48" includes a pair of first ribs 38". The ribs 38" are engaged in slots 34'. Ribs 38" and slots 34' engage in a manner similar to the first alternative embodiment in that each rib has a cam surface similar to cam surface 43 that moves in engagement with a cam support surface of the slot similar to edge 37. The sides of the ribs 38" are disposed from the side walls of the slots in a manner similar to the first alternative embodiment. Transverse movement of the deflector member 48" is prevented by engagement of the deflector member with the side guide 62.

The spaced first ribs of the second alternative embodiment provide greater transverse stability for the deflector member 48" compared to the other described embodiments. In other embodiments, other numbers and configurations of ribs and slots may be used, including combinations that provide transverse support by engagement with the sides of the slot. Of course, as explained above, the ability to support the deflector member with a side guide or similar transverse support may eliminate the need to provide transverse support for the deflector member by engagement of the sides of the ribs with the slots in some embodiments. Likewise, in other embodiments, supporting the deflector member transversely through the ribs may eliminate the need for other transverse supports. From the description of the invention herein, those skilled in the art may tabor the invention to the requirements of a particular sheet handling system.

Figure 5:
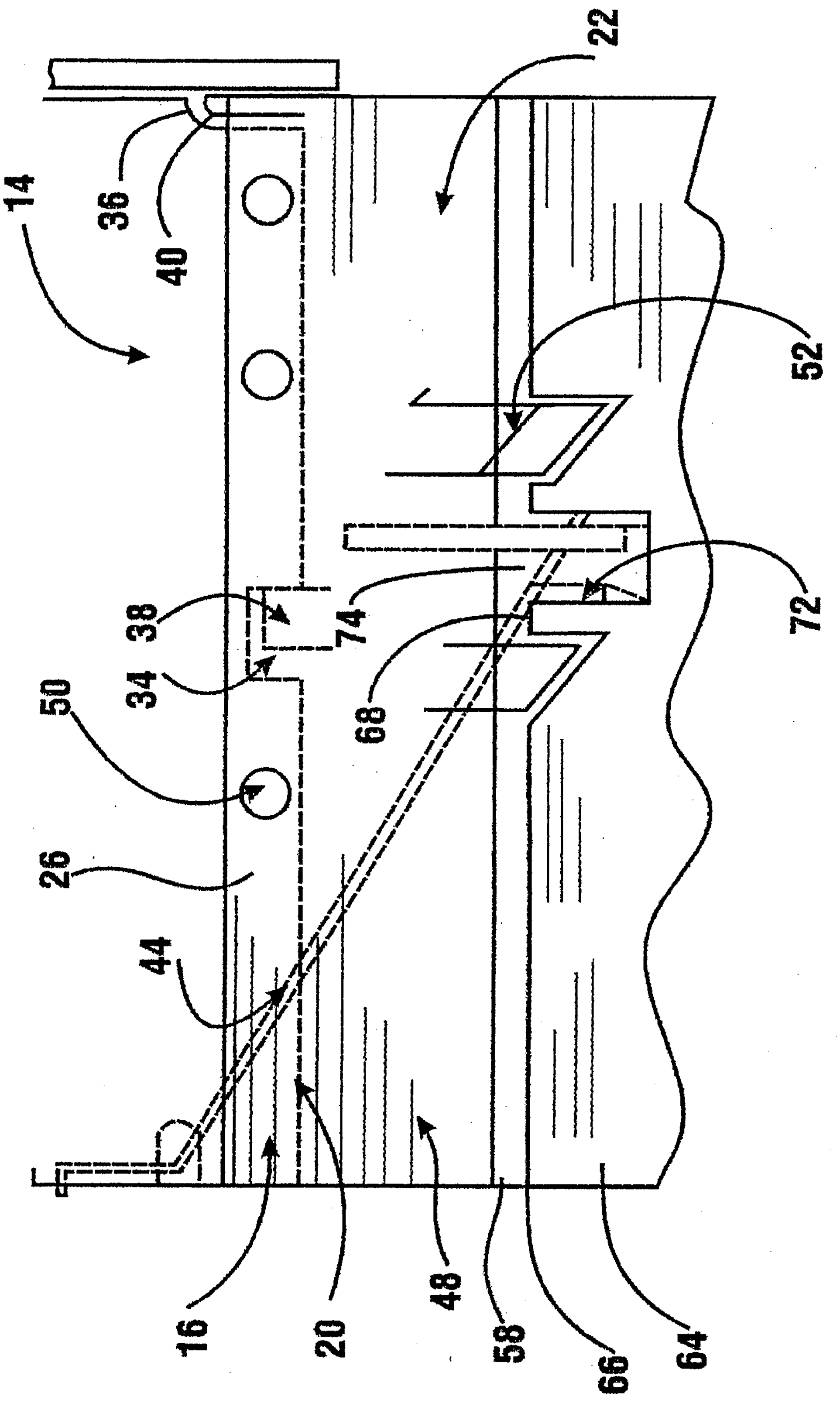
FIG. 5 is a top view of the seamless paper media gate in engagement with a sheet guide member.
Figure 6:
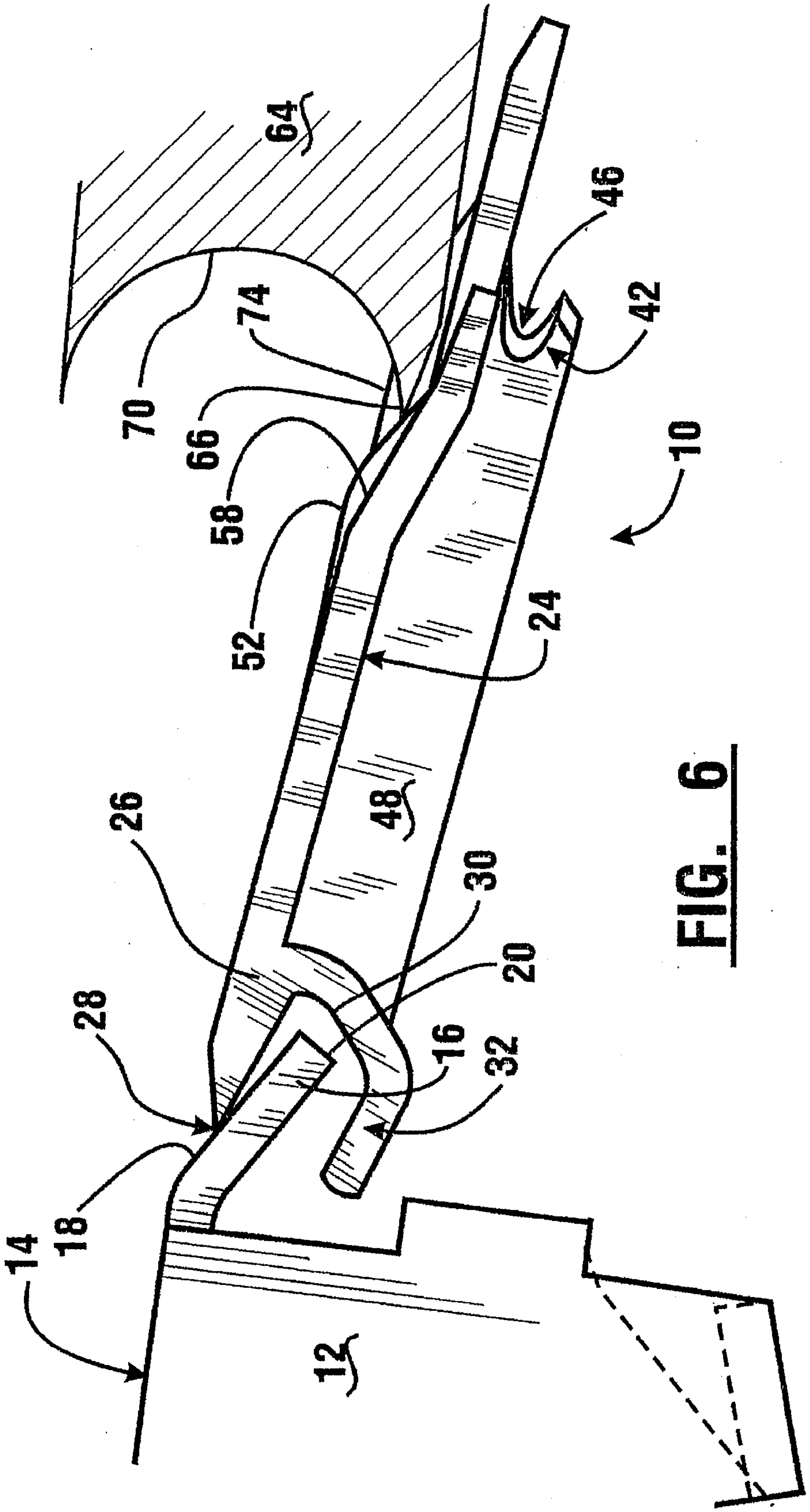
FIG. 6 is a side view of the seamless paper media gate in engagement with a sheet guide member.

As shown in FIGS. 5 and 6 the deflector member of any of the described embodiments is engageable with a sheet guide member 64. Sheet guide member 64 includes a blade edge 66 that is engageable with the second transition surface 58 of the deflector member. The sheet guide member also includes a pair of tines 68 which are adapted for interfitting engagement with recesses 60 in the deflector member.

The sheet guide member 64 also includes an arcuate surface 70. Arcuate surface 70 is adapted for engaging and directing sheets to turn 180° in supported relation thereon. Optimally a belt riding on a pulley is positioned adjacent arcuate surface 70. The sheet guide member 64 includes a central cut out 72 as shown in FIG. 5 which accepts a projection 74 on the deflector member therein when the sheet guide member 64 is adjacent thereto. As a result a transport belt is enabled to be supported on projection 74 to aid in guiding sheets into engagement with arcuate surface 70.

The smooth transportation of sheets from the deflector member and into engagement with the sheet guide member 64 is further aided by the sheet engaging ridges 52. Ridges 52 move the central portion of a sheet upward. The tines 68 positioned in the recesses 60 are underneath the sheet to assure that the sheet predictably engages the arcuate surface. In addition, the blade edge 66 engages the second transition surface in gapless relation to assure that sheet surfaces disposed away from the center of the sheet are not snagged.

An advantage of the cooperation of the sheet guide member 64 and the deflector member is that a sheet may be turned 180° for purposes of reading or scanning of both sides. Of course, the sheet guide member may be moved away from the deflector member 48 and the deflector member moved to a suitable angular position by engagement of projection 54. This enables a document to move past the sheet guide member and move out of (or into) supported engagement with the deflector member from any desired angle. This enables the device of the present invention to accept or receive sheets from mechanisms or storage compartments located at a variety of angular positions. Further the plate member itself is preferably part of a mechanism that is capable of rotational movement so that sheet may be accessed from or delivered to many angular positions.

The device of the present invention provides a gapless variable angle sheet support. However, the preferred embodiments of the apparatus is readily and economically manufactured. This is possible because the device maintains the same cross sectional point on the lineal edge in seamless engagement with the transition surface throughout the angular range of movement for the deflector. This is due to the action of the spring and pivot achieved by the cooperation of the first rib and slot. As a result, the transition surface and end portion and deflector member may be formed by conventional fabricating methods with tolerances that are readily maintained.

The deflector member of the preferred embodiment is molded of plastic material, which provides for consistent dimensions and contours for the finger portions. The molded character of the deflector member also enables the precise forming of the ribs, projections and apertures thereon.

While the preferred embodiment of the invention uses a molded deflector member and a three-way spring, other embodiments of the invention may use other deflector assemblies and may be biased using multiple springs to achieve a seamless gate for paper media.

Thus the seamless paper media gate of the present invention achieves the above-stated objectives, eliminates difficulties encountered in the use of prior devices and systems, solves problems and attains the desirable results described herein.

In the foregoing description, certain terms have been used for brevity, clarity, and understanding, however, no unnecessary limitations are to be implied therefrom because the terms herein are for descriptive purposes and are intended to be broadly construed. Moreover, the descriptions and illustrations herein are by way of examples and the invention is not limited to the exact details shown or described. Further in the appended claims any feature described as a means for performing a function shall be construed as encompassing any means capable of performing the stated function and shall not be limited to the particular means for performing the function described herein, or mere equivalents.

Having described the features, discoveries and principles of the invention, the manner in which it is constructed and operated and the advantages and useful results attained; the new and useful structures, devices, elements, arrangements, parts, combinations, systems, equipment, operations and relationships are set forth in the appended claims.

I claim:

1. A device for supporting moving paper sheets, said sheets moving in a sheet direction along a sheet path on said device, said sheets having a sheet width transverse to said sheet direction, said device being moveable to support sheets moving thereon in a plurality of angular positions within a range, comprising:

a plate member, said plate member including a generally planar first sheet supporting surface in said sheet path, said first sheet supporting surface being at least as wide in a direction transverse of said sheet direction as said sheet width, said plate member further including a transition surface in said sheet path, said transition surface being a smooth continuation of said first surface in said sheet direction and being at least as wide in said transverse direction as said sheet width, said transition surface extending at an acute angle relative to said first surface; and a deflector member, and a connecting member operatively connecting said deflector member and said plate member, wherein said deflector member is angularly movable relative to said plate member, said deflector member having a generally planar second sheet supporting surface thereon, said second sheet supporting surface being in said sheet path, said second sheet supporting surface at least as wide in said transverse direction as said sheet width, said deflector member including in cross section a first finger portion, said first finger portion in cross section bounded by said second sheet supporting surface and tapered to a point, wherein said second sheet supporting surface engages said transition surface at said point, whereby said second surface terminates at a lineal edge extending in said transverse direction, and wherein in cross section said point is in gapless engagement with said transition surface when said deflector member is in any of said plurality of angular positions within said range.

2. The device according to claim 1 wherein one of either said transition surface or said finger portion includes a rib, and said other of said transition surface or finger portion includes a slot, and wherein said rib is accepted in said slot when said deflector member is in said range.

3. The device according to claim 1 wherein said plate member includes an end portion, said transition surface being on said end portion, said end portion including a slot and wherein said slot is bounded by a cam support surface, and wherein said finger portion of said deflector member further comprises a rib, said rib extending on a side of said deflector member opposed of said second surface, and wherein said rib includes a cam surface, and wherein said cam surface is in slidable engagement with said cam support surface throughout said range of said deflector member.

4. The device according to claim 3 wherein said end portion of said plate member and said deflector member each include at least one aperture, and wherein said apertures on said respective end portion and deflector member are in alignment throughout said range, whereby a sheet sensing means is enabled to sense sheets through said apertures.

5. The device according to claim 3 wherein said deflector member rotates in said range about a fixed pivot point.

6. The device according to claim 5 wherein said fixed pivot point in cross section is a point of engagement of said first finger portion and said transition surface.

7. The device according to claim 3 wherein said slot is further bounded by a deflector bearing surface, said deflector bearing surface extending generally perpendicular to said cam support surface, and wherein said rib further comprises a rib side surface, said rib side surface extending generally perpendicular to said cam surface, and wherein said rib side surface is in slidable abutting engagement with said deflector bearing surface.

8. The device according to claim 7 and further comprising a spring, wherein said spring biases said cam surface to engage said cam support surface and biases said rib side surface to engage said deflector bearing surface.

9. The device according to claim 8 wherein said first finger portion rotates in said range and in cross section rotates about a fixed pivot point on said transition surface.

10. The device according to claim 1 and wherein said connecting member comprises a spring wherein said spring biases said lineal edge said transition surface throughout said range.

11. The device according to claim 1 wherein said plate member includes an end portion, said transition surface being on said end portion, said end portion including a slot and wherein said slot is bounded by a deflector bearing surface, and wherein said rib extends on a side of said deflector member opposed of said second surface, and wherein said rib is in slidable engagement with said deflector bearing surface throughout said range of said deflector member.

12. The device according to claim 11 wherein said connecting member comprises a spring wherein said spring biases said deflector member wherein said lineal edge is biased to engage said transition surface and said rib is biased to engage said deflector bearing surface.

13. The device according to claim 1 wherein said plate member further comprises an end portion, said end portion terminating at a transition edge, said end portion including a slot therein said slot extending into said end portion from said transition edge, said slot bounded by a deflector bearing surface extending generally perpendicular to said transition edge, and wherein said deflector member further comprises a rib, and wherein said rib extends in accepted relation in said slot, and wherein said rib has a rib side surface and wherein said rib side surface is in abutting moveable contact with said deflector bearing surface.

14. The device according to claim 13 wherein said slot is further bounded by a cam support surface extending generally a transverse of said bearing surface, and wherein said rib further comprises a cam surface abuttingly engaging said cam support surface throughout said range of the deflector member.

15. The device according to claim 14 and further comprising a spring biasing said lineal edge to engage said transition surface and further biasing said cam and fib side surfaces of said rib to engage said cam support and bearing surfaces respectively.

16. The device according to claim 1 and wherein said plate member further comprises an end portion, said transition surface being on said end portion, and wherein said deflector member further comprises in cross section a second finger portion wherein said end portion extends in intermediate relation between said first and second finger portions, and wherein said end portion is abuttingly engaged with said second finger portion when said deflector is at a first end of said range.

17. The device according to claim 16 wherein said deflector member further comprises a rib extending between said first and second finger positions, and wherein said end portion includes a slot, said slot bounded by a deflector bearing surface, and wherein said rib extends in said slot, and said connecting member comprises a three-way spring, wherein said spring biases said deflector member wherein said lineal edge is biased to engage said transition surface, said rib is biased to abut said bearing surface and said deflector member is biased to the first end of said range.

18. The device according to claim 1 wherein said deflector member includes a side face at a transverse side of said second surface and wherein said device further comprises a side guide in abutting moveable engagement with said side face.

19. The device according to claim 18 and wherein said connecting member comprises a spring wherein said spring biases said deflector wherein said lineal edge is biased to engage said transition surface, and said side face is biased to engage said side guide.

20. The device according to claim 18 wherein said plate member comprises an end portion, said transition surface being on said end portion and wherein said end portion includes a notch and wherein said deflector member comprises a second rib, wherein said second rib extends in said notch, and wherein said side face is on said second rib.

21. The device according to claim 1 wherein said deflector member further comprises at least one recess in said second surface, said recess disposed in said sheet direction from said lineal edge, said recess elongated in the sheet direction whereby a tine of a sheet guide is enabled to be accepted therein.

22. The device according to claim 1 and further comprising a second transition surface on said deflector member, said second transition surface being disposed from said lineal edge and being a smooth continuation of said second surface, said second transition surface in cross section extending at a second acute angle relative to said second surface, whereby a blade edge of a sheet guide is enabled to engage said second transition surface in gapless relation.

23. The device according to claim 1 and wherein said connecting member comprises a three-way spring including a leg, and further comprising a detent on said deflector member, and wherein said three-way spring biases said lineal edge to engage said transition surface and wherein said leg is moveable in said detent as said deflector member moves in said range.

24. The device according to claim 1 wherein said plate member and said deflector member are relatively movable in cross section about a fixed pivot point and wherein said lineal edge is maintained in abutting contact with said transition surface at said pivot point as said deflector member moves in said range.

25. A device for supporting moving sheets moving along a sheet path thereon comprising:

plate member means for supporting sheets moving thereon, said plate member means including in said sheet path a member surface, wherein said member surface supports sheets moving thereon;

a deflector member means for supporting sheets moving thereon, said deflector member means including in said sheet path a deflector sheet supporting surface, wherein said deflector sheet supporting surface supports sheets moving thereon, wherein said deflector sheet supporting surface of said deflector member means is angularly movable relative to said member surface of said plate member means in a range of angular positions; and substantially non-fixed pivot means for connecting said plate member means and said deflector member means in angularly movable connection, and for maintaining said deflector sheet supporting surface in continuous engagement with said member surface wherein said deflector sheet supporting surface provides a smooth continuation of said member surface in said sheet path in all angular positions of said deflector member means in said range.

26. The device according to claim 25 wherein said pivot means includes an interengaging rib and slot, one of said rib or slot in connection with said plate member means and said other of said rib or slot in connection with said deflector member means, and a biasing means operatively connected with said plate member means and said deflector member means for biasing said rib and slot into engagement.

27. The device according to claim 26 wherein said rib includes a cam surface and said slot includes a cam support surface, and wherein said cam and said cam support surfaces are in abutting slidable relation.

28. A device for supporting moving paper sheets, said sheets moving in a sheet direction, comprising:

a first member having a first sheet supporting surface whereby sheets are movable on said first sheet supporting surface;

a transition portion in connection with said first member, said transition portion including at least one slot therein, said slot bounded by a cam support surface on said transition portion;

a movable member, and a connecting member operably connecting said first member and said movable member in relatively movable relation, wherein said movable member is angularly movable relative to said first member in a range, wherein said movable member includes a second sheet supporting surface whereby sheets are movable thereon, and wherein said movable member comprises at least one rib, said rib including a cam surface thereon, and wherein said cam surface of said rib is in engagement with said cam support surface throughout said range, and wherein in cross section said second sheet supporting surface is in generally smooth continuous engagement with said first sheet supporting surface in said sheet direction throughout said range of angular movement of said movable member.

29. The device according to claim 28 wherein said movable member engages said first sheet supporting surface at a lineal edge and wherein said movable member is rotatable about said lineal edge.

30. A method for supporting moving paper sheets while said sheets move at angular directions in a range, comprising the steps of:

moving said sheets in supported relation on a first member, said sheets moving on said first member on a first sheet supporting surface and a transition sheet supporting surface, said transition surface extending as a smooth continuation of said first surface and at an acute angle thereto, and wherein said transition surface has at least one slot therein said slot bounded by a cam supporting surface;

moving said sheets to and from said transition surface to supported relation with a second sheet supporting surface on a deflector member, said deflector member in operative connection with said first member and being angularly movable relative thereto, said second sheet supporting surface of said deflector member gaplessly engaging said transition surface along a lineal edge, and wherein said deflector member includes at least one rib having a cam surface thereon, and wherein said rib is engaged in said slot;

moving said deflector member angularly in said range with said cam surface of said rib in slidably supported relation with said cam supporting surface of said slot, and wherein as said deflector moves it rotates about a fixed pivot at said lineal edge and said second sheet supporting surface is a smooth continuation of said transition surface.

31. A device for supporting moving paper sheets, said sheets moving in a sheet direction along a sheet path on said device comprising:

a plate member, a deflector member and a spring;

wherein said plate member comprises in cross section a generally planar first supporting surface in said sheet path, said plate member further comprising in cross section a transition surface in said sheet path, said transition surface being a smooth continuation of said first surface in said sheet direction, said transition surface extending at an acute angle relative to said first surface;

wherein said deflector member comprises in cross section a generally planar second sheet supporting surface in said sheet path, and a first finger portion bounded in cross section by said second sheet supporting surface and tapered to a point; and wherein said spring operatively connects said plate member and said deflector member, and wherein said spring enables said second supporting surface to angularly move in a range relative to said first supporting surface and biases said point to engage said transition surface in smooth continuous relation in said sheet direction throughout said range of angular movement.

* * * * *